United States Patent [19]

Lunney

[11] Patent Number: 5,326,956
[45] Date of Patent: Jul. 5, 1994

[54] LASER PROFILING OF LENS EDGE

[75] Inventor: James G. Lunney, Dublin, Ireland

[73] Assignee: Bausch & Lomb Incorporated, Rochester, N.Y.

[21] Appl. No.: 921,193

[22] Filed: Jul. 28, 1992

[30] Foreign Application Priority Data

Jul. 29, 1991 [IE] Ireland .................................. 2667/91

[51] Int. Cl.⁵ .............................................. B23K 26/00
[52] U.S. Cl. ............................ 219/121.69; 219/121.75
[58] Field of Search ....................... 219/121.74, 121.68, 219/121.69, 121.75

[56] References Cited

U.S. PATENT DOCUMENTS

| | | | |
|---|---|---|---|
| 4,307,046 | 12/1981 | Neefe ..................................... | 264/1.4 |
| 4,563,565 | 1/1986 | Kampfer et al. ...................... | 219/121 |
| 4,642,439 | 2/1987 | Miller et al. ......................... | 219/121 |
| 5,061,840 | 10/1991 | Portney et al. ................. | 219/121.68 |

OTHER PUBLICATIONS

Applied Optics/vol. 17, No. 10/15 May 1978, pp. 1532 to 1536.
U.S. patent application Ser. No. 07/424,758, filed Oct. 1989 by Lunney.

*Primary Examiner*—C. L. Albritton
*Attorney, Agent, or Firm*—David M. Krasnow

[57] ABSTRACT

A method for forming a curved edge on a lens comprising the steps of providing an annular laser beam and irradiating a first peripheral region of the lens with the laser beam to remove a layer of lens material from the first peripheral region through ablative photodecomposition. Next, a second peripheral region of the lens is irradiated with the laser beam to remove a layer of lens material from the second peripheral region.

8 Claims, 5 Drawing Sheets

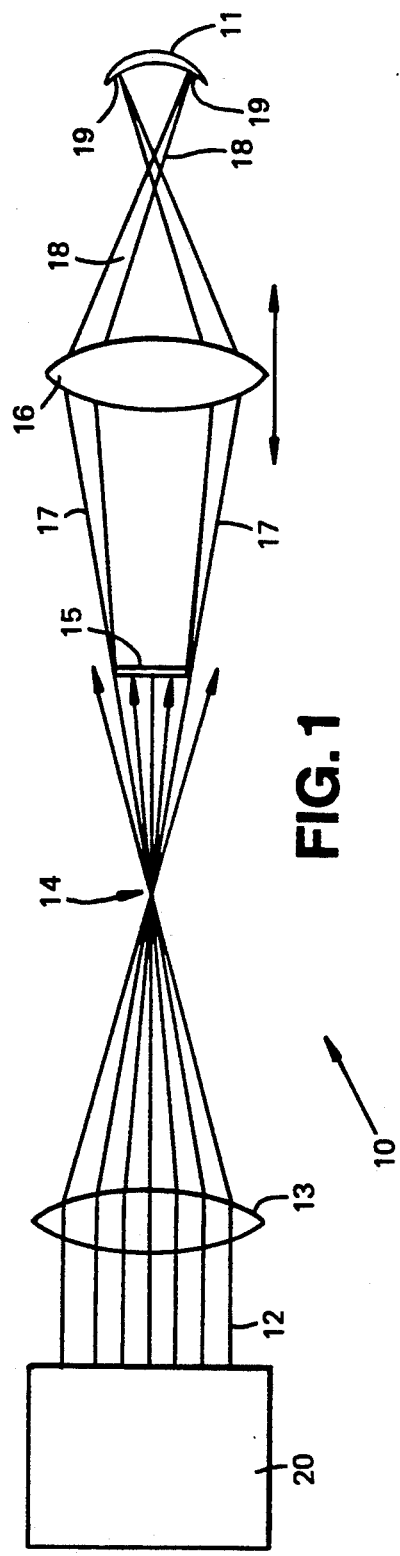
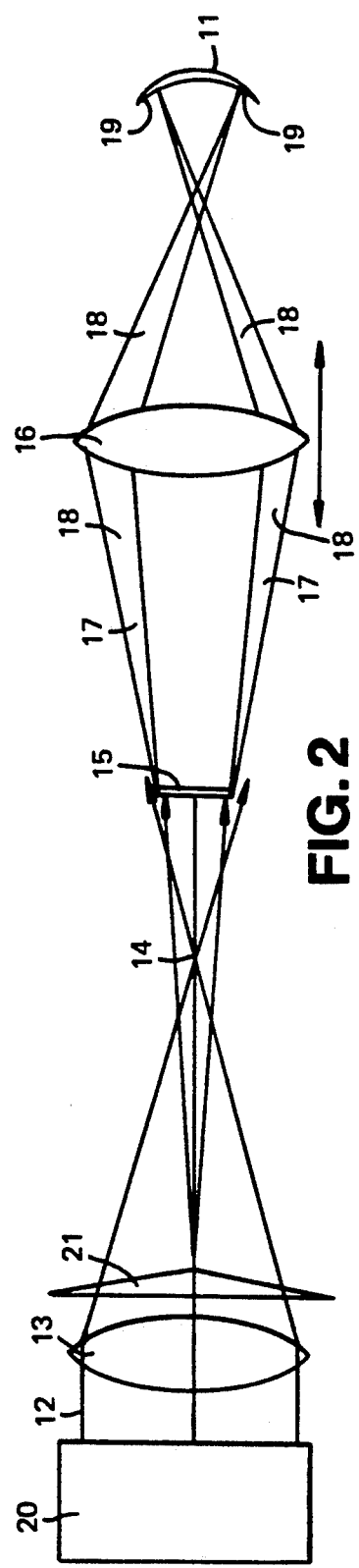

500 μm

LASER PROFILING OF LENS EDGE

The present invention relates to a method for producing a curved or rounded edge on a lens, in particular a contact lens.

According to the invention there is provided a method for forming a curved edge on a lens comprising the steps of providing an annular laser beam, irradiating a first peripheral region of the lens with the laser beam to remove a layer of lens material from the first peripheral region through ablative photodecomposition, and irradiating a second peripheral region of the lens with the laser beam to remove a layer of lens material from the second peripheral region.

In a preferred form of the invention there is provided a method for forming a curved edge on a lens wherein the first peripheral region of the lens is irradiated for a first number of laser shots, the internal diameter of the annular laser beam is changed to expose the second peripheral region of the lens irradiating the second peripheral region of the lens, with the annular laser beam for a second number of laser shots, wherein said second number of laser shots is greater than said first number of laser shots.

Preferably, the internal diameter of the annular laser beam is increased in a plurality of small steps with the number of laser shots to which successive peripheral regions of the lens is exposed being increased at each step.

The fluence of the laser beam is preferably maintained constant during exposure of successive peripheral regions of the lens.

In one embodiment of the invention the annular laser beam is produced by imaging a mask onto a lens. The mask is preferably a circular disc.

In another embodiment of the invention, the annular laser beam is produced using a lens/axicon combination.

An embodiment of the invention will now be described by way of example, with reference to the accompanying drawings, in which;

FIG. 1 is a schematic representation of one optical arrangement for forming a curved edge on a lens according to the invention;

FIG. 2 is a schematic representation of another optical arrangement for forming a curved edge on a lens according to the invention;

Figure 3:
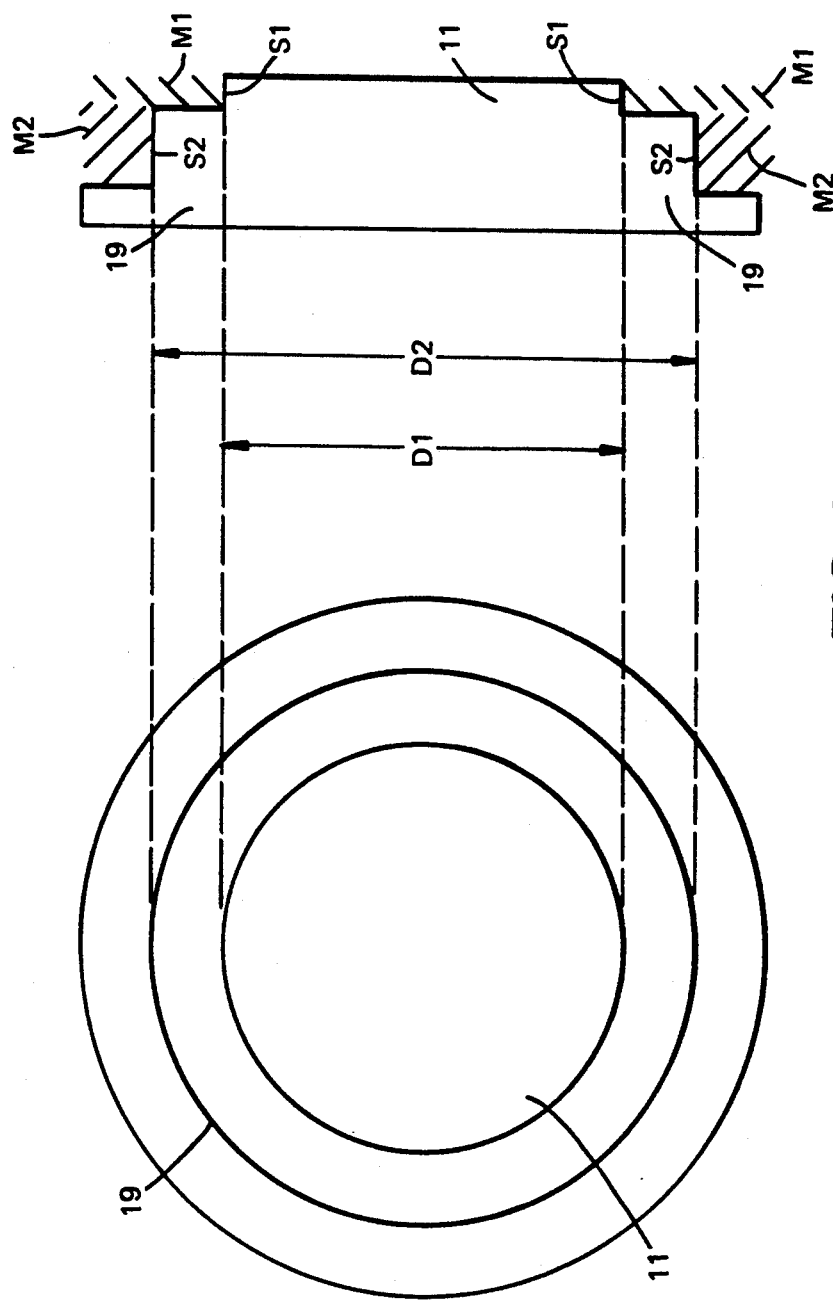
FIG. 3 is a schematic representation of the steps cut in the periphery of a lens according to the method of the invention.

Referring now to the drawings, wherein similar numerals have been used to indicate like parts, there is shown in FIG. 1 one optical arrangement generally indicated at 10 for forming a curved edge on a contact lens 11. A laser beam 12 is produced by a suitable laser 20, and the fluence of the laser beam 12 is controlled by a focussing lens 13. As shown, the laser beam 12 is brought to a focus 14 in front of a disc shaped mask 15 and the laser beam then diverges towards the mask 15. An imaging lens 16 is located between the mask 15 and the contact lens 11, the imaging lens 16 serving to image the portion 17 of the laser beam 12 which passes around the mask 15, on to the periphery 19 of the contact lens 11.

The use of the mask 15 between the focussing lens 13 and the imaging lens 16 serves to produce an annular laser beam 18 which irradiates the periphery 19 of the contact lens 11, the laser beam 18 having with a well defined inner diameter.

A similar arrangement is illustrated in FIG. 2 but in this case an axicon lens 21 is used together with the focussing lens 13 to produce a ring shaped (annular) laser beam with a desired fluence, at the mask 15. The axicon lens 21, which in this example produces a converging beam, ensures a more efficient use of the laser energy as the axicon lens/focussing lens produces an annular laser beam.

It will be appreciated that the type of laser used and the fluence value of the annular laser beam 18 will be such as to provide a suitable laser energy to enable controlled removal of material from the periphery 19 of the lens 11 through ablative photo-decomposition. The rate of ablative photo-decomposition will of course depend upon the wavelength of the laser beam, the fluence of the laser beam, the number of shots (pulses) of the laser beam to which the lens is exposed and of course, the material of the lens 11.

Referring now to FIG. 3 the operation of the method according to the invention will be explained. The imaging lens 16 is positioned so that the annular laser beam 18 at the contact lens 11 has an internal diameter D1. Thus, the periphery 19 of the lens 11 outside the diameter D1 is exposed to the annular laser beam 18 and the region of the lens within the diameter D1 is not exposed to the annular laser beam 18. Therefore material M1 from the periphery 19 of the lens is removed through ablative photo-decomposition. The removal of the material M1 from the periphery 19 of the lens results in a small step S1 being formed on the lens surface, as shown in FIG. 3. Next, the internal diameter of the annular laser beam 18 is increased to D2 by adjusting the position of the imaging lens 16 and the process is repeated. Thus, the periphery 19 of the lens 11 outside the diameter D2 is exposed to the annular laser beam 18 and the region of the lens within the diameter D2 is not exposed to the annular laser beam 18. Therefore material M2 from the periphery of the lens is removed through ablative photo-decomposition. As before, the removal of the material M2 from the periphery 19 of the lens results in another small step S2 being formed on the lens surface, as shown in FIG. 3.

The internal diameter of the annular laser beam is controlled by moving the imaging lens towards or away from the contact lens 11. With this arrangement the imaging is only approximate but it is believed that this has the advantage of blurring the imaged edges of the mask so that the steps S1, S2 shown in FIG. 3 are not clearly defined.

It will be appreciated that while only two irradiation steps are described above, in practice a large number of steps Sn each with a very small increase in the internal diameter of the annular laser beam are used. Furthermore, at each successive irradiation diameter the number of laser shots is increased to produce the desired curved edge. Thus, the number of laser shots used at diameter D2 is greater than the number of shots used at position D1 and therefore the step S2 is of greater depth than the step S1. This increase in the depth of the successive steps, outwardly towards the edge of the lens is necessary to produce the desired curved edge. As expected, an equal number of laser shots at each irradiation diameter produces a straight sloping edge.

In the following examples a Lambda Physik 102 MSC Laser was used operating at a wavelength of 193 nm with a pulse length of 20 ns. In view of the limited energy available from this laser it was only possible to irradiate part of the edge of the contact lens. However, a complete irradiation of the periphery can be obtained by rotating the contact lens sample through one or more revolutions for each position of irradiation.

EXAMPLES

Figure 4:
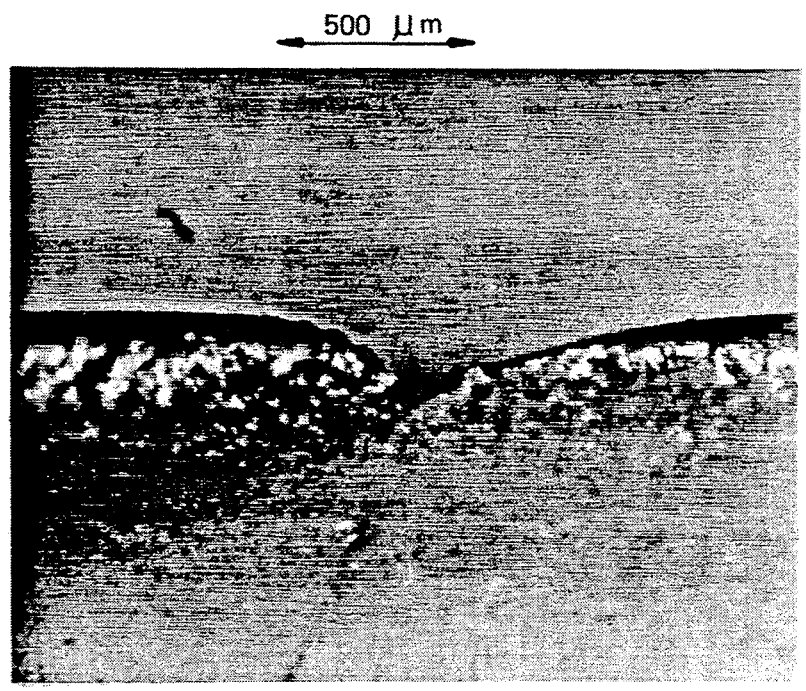
FIGS. 4, 5 and 6 are scanning electron microscope photographs of profiles cut in various samples.

An initial experiment was carried out on a Perspex (RTM) sample which has photoablation characteristics that are broadly similar to some of the hard contact lens materials. A stepped profile, with increasing step height was produced as is shown in FIG. 4. In this example, the following sequence of laser shots was used at the respective diameters of the laser beam.

| Diameter of Laser Beam | No. of Shots |
|---|---|
| Di | 1 |
| Di + d | 2 |
| Di + 2d | 4 |
| Di + 3d | 8 |
| Di + 4d | 16 |
| Di + 5d | 32 |
| Di + 6d | 64 |
| Di + 7d | 128 |
| Di + 8d | 256 | where Di is the initial diameter and d is approximately 50 $\mu$m. The increase in the internal diameter of the annular laser beam is achieved by moving the imaging lens 16 away from the lens 11, by approximately 2 mm at each step. In order to produce a smoother profile the step size was reduced and the following sequence of laser shots was used at the respective diameters of the laser beam.

Figure 5:
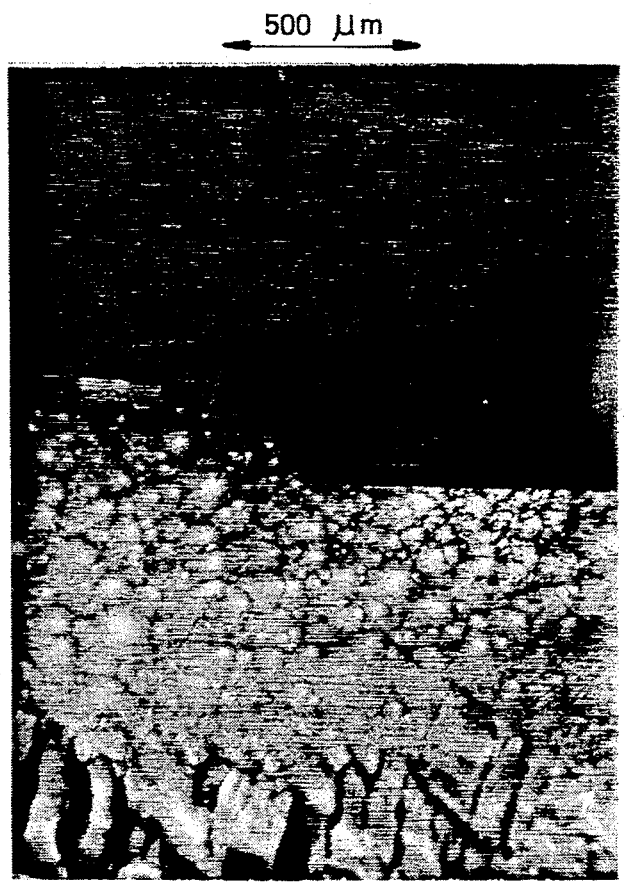

| Diameter of Laser Beam | No. of Shots |
|---|---|
| Di | 1 |
| Di + d | 2 |
| Di + 2d | 3 |
| Di + 3d | 4 |
| Di + 4d | 5 |
| Di + 5d | 6 |
| Di + 6d | 7 |
| Di + 7d | 8 |
| Di + 8d | 10 |
| Di + 9d | 13 |
| Di + 10d | 17 |
| Di + 11d | 22 |
| Di + 12d | 28 |
| Di + 13d | 35 |
| Di + 14d | 43 |
| Di + 15d | 52 |
| Di + 16d | 62 |
| Di + 17d | 73 |
| Di + 18d | 85 | where Di is the initial diameter of the laser beam and the initial diameter is increased in multiples of d which is approximately 25 $\mu$m. The increase in the diameter of the laser beam is achieved by moving the imaging lens away from the lens 11 by approximately 1 mm at each step. The result is shown in FIG. 5 which illustrates a much smoother profile.

Figure 6:
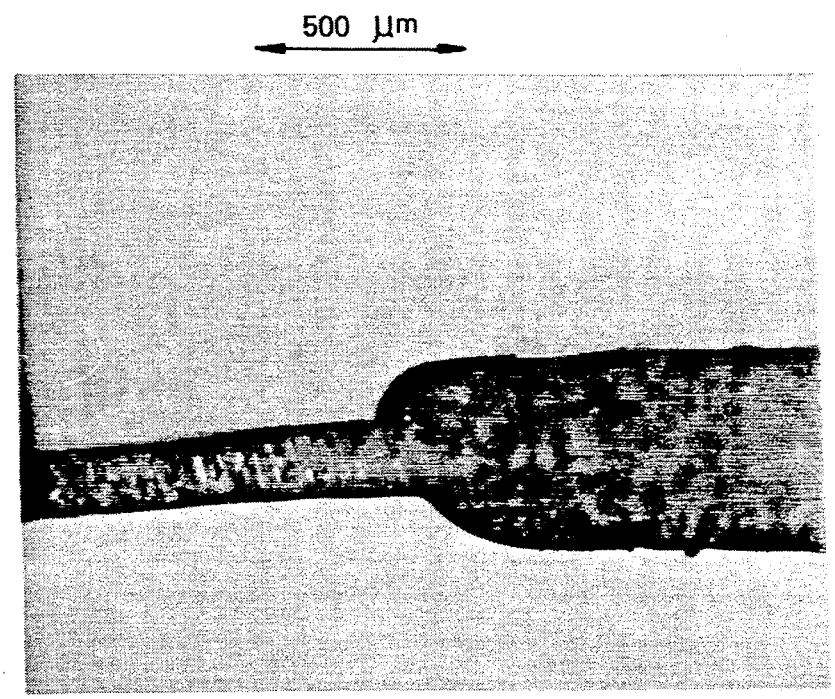

A hydrogel sample shown in FIG. 6 was cut from both sides by rotating the sample through 180° and repeating the cutting operation. The alignment of the two cuts is not perfect but this is due to some inaccuracy of the rotation apparatus which was used. With sufficiently accurate location equipment there would be no difficulty in producing properly aligned profiles cut from each side of a lens.

It will be appreciated that the method described with reference to FIG. 3 may be carried out in reverse i.e. by first irradiating at a large diameter of the laser beam, and successively reducing the diameter of the laser beam.

Figure 7:
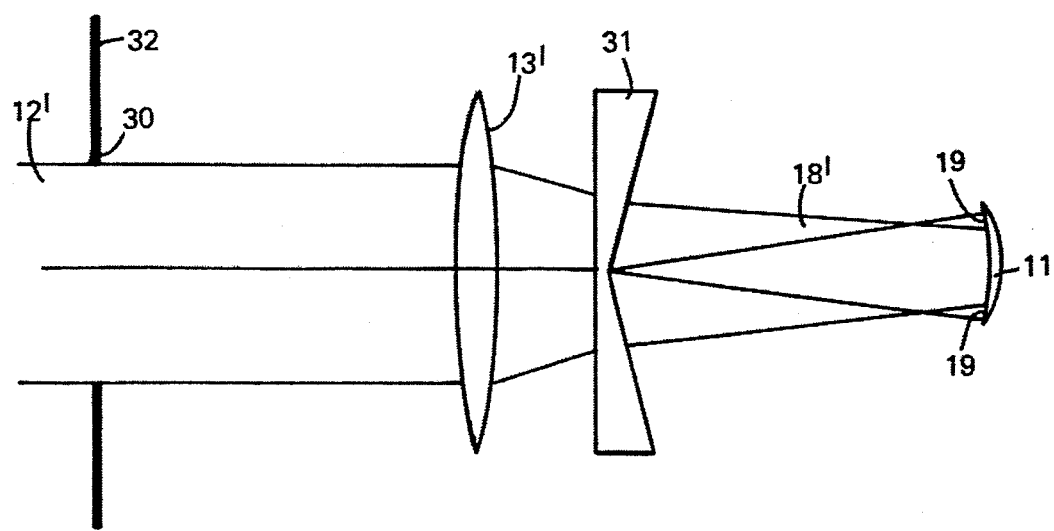
FIG. 7 is a schematic representation of a further optical arrangement for forming a curved edge on a lens according to the invention.

Referring now to FIG. 7 of the accompanying drawings there is shown therein a further optical arrangement for forming a curved edge on a lens using a diverging axicon lens. As shown, a laser beam 12' is directed through an aperture 30 in a plate 32 and a focussing lens 13' and diverging axicon lens 31 are used to produce an annular laser beam 18' which is directed onto the periphery 19 of a contact lens 11. This particular arrangement is advantageous in that light rays from the edge of the aperture are imaged to the inner edge of the annular beam to give a sharp radial variation of laser fluence at that edge. The innermost diameter of the annular laser beam is increased by decreasing the separation of the lens 13' and axicon lens 31. Conversely, the innermost diameter of the annular laser beam is decreased by increasing the separation of the lens 13' and axicon lens 31.

In use, this optical arrangement is used to perform the method described above in relation to FIG. 3.

Figure 8:
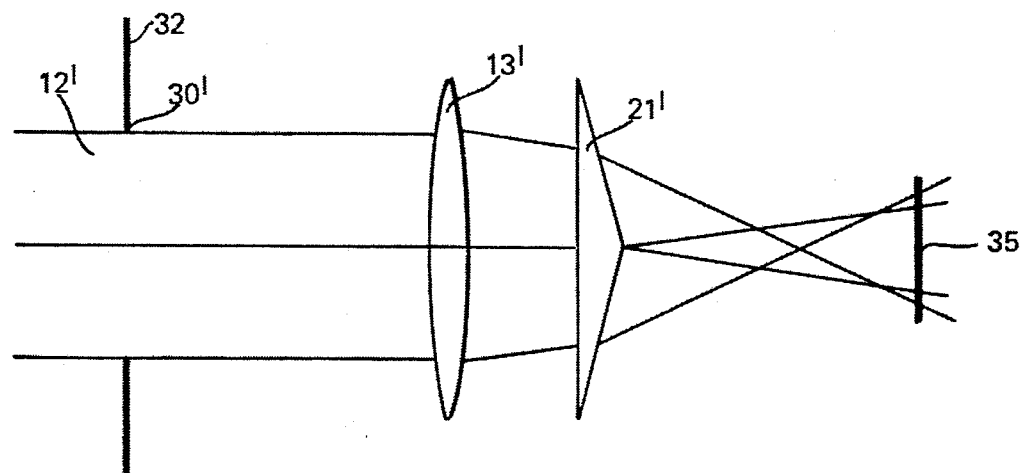
FIG. 8 is a schematic representation of yet a further optical arrangement for forming a curved edge on a lens according to the invention.

A further optical arrangement is illustrated in FIG. 8 which utilises a converging axicon lens 21'. A 5 mm circular aperture 30' in a plate 32 is used to select a uniform region of the laser beam 12', from an excimer laser operating at 193 nm. The total energy in the annular beam was 17 mJ/pulse. The optical arrangement was used to cut a curved edge on a 1 mm thick flat sheet of pure PMMA 35. A curved edge profile (FIG. 9) was cut by decreasing the separation of the axicon lens 21' and focussing lens 13' by moving the axicon lens in steps and using the following sequence of laser shots, where Di is the initial diameter of the laser beam and the initial diameter is increased by multiples of d which is approximately 55 $\mu$m.

| Diameter of Laser Beam | No. of Shots |
|---|---|
| Di | 40 |
| Di + d | 60 |
| Di + 2d | 80 |
| Di + 3d | 115 |
| Di + 4d | 150 |
| Di + 5d | 225 |
| Di + 6d | 300 |
| Di + 7d | 550 |
| Di + 8d | 1200 |
| Di + 9d | 1800 |

Figure 9:
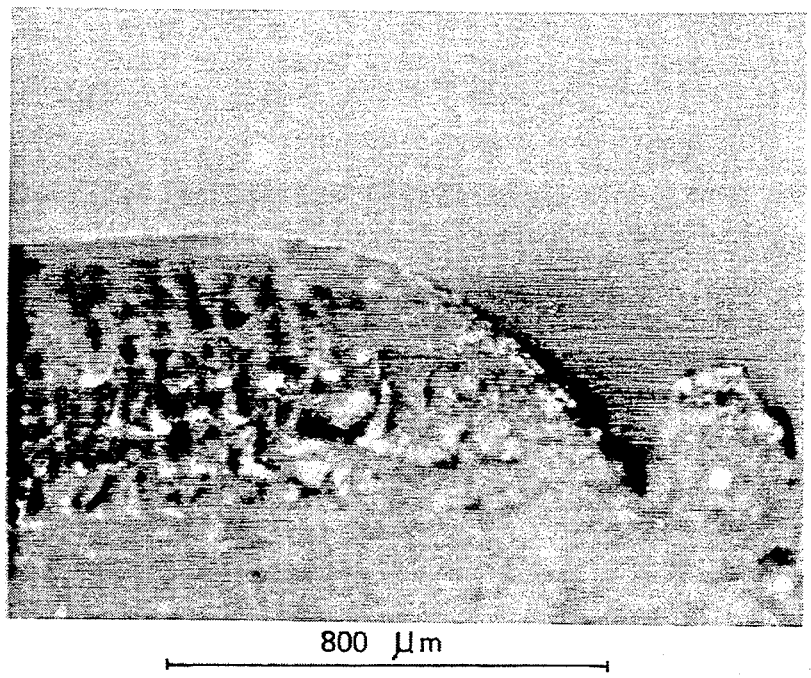
FIG. 9 is a scanning electron microscope photograph of a profile cut in the edge of a flat sheet of a PMMA sample.

As shown in FIG. 9 a curved edge of acceptable quality has been formed.

I claim:

1. A method for forming a curved edge on a lens comprising the steps of
providing an annular laser beam, irradiating a first peripheral region of the lens with the laser beam for a first number of shots to remove a layer of lens material from the first peripheral region through ablative photodecomposition;
altering the internal diameter of the annular laser beam to expose the second peripheral region of the lens; and
irradiating a second peripheral region of the lens with the laser beam for a second number of laser shots to remove a layer of lens material from the second peripheral region, wherein said second number of laser shots is greater than said first number of laser shots.

2. A method as claimed in claim 1, wherein the internal diameter of the annular laser beam is increased in a plurality of small steps with the number of laser shots to which successive peripheral regions of the lens is exposed being increased at each step.

3. A method as claimed in claim 1, wherein the fluence of the laser beam is preferably maintained constant during exposure of successive peripheral regions of the lens.

4. A method according to claim 1, wherein the annular laser beam is produced by imaging a mask onto a lens.

5. A method according to claim 4 wherein the mask is preferably a circular disc.

6. A method according to claim 1, wherein the annular laser beam is produced using a focussing lens and axicon lens.

7. A method according to claim 6 wherein the axicon lens is a diverging axicon lens.

8. A method according to claim 6 wherein the axicon lens is a converging axicon lens.

* * * * *